J. B. WANTZ.
ELECTRIC CIRCUIT CONTROLLING MECHANISM.
APPLICATION FILED JUNE 4, 1914.

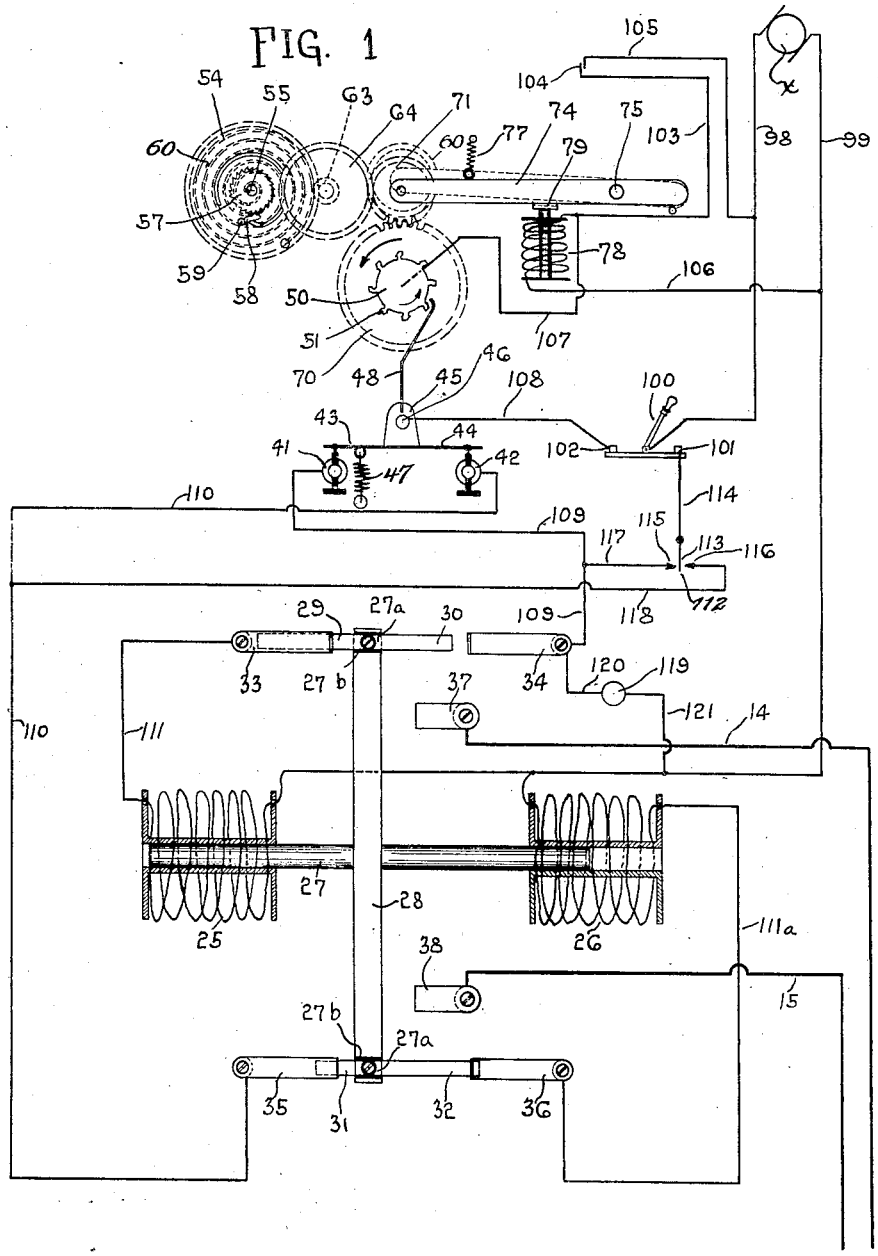

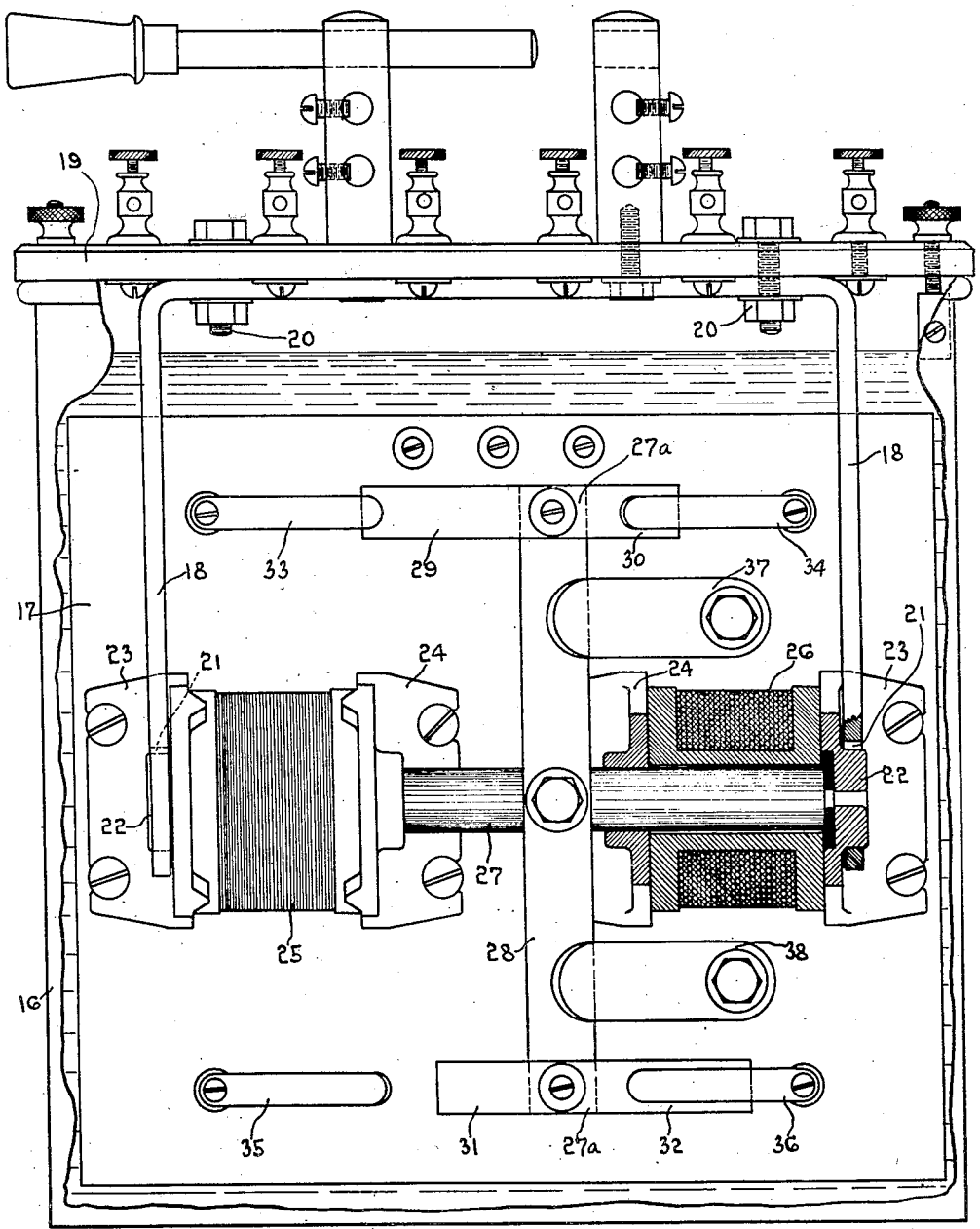

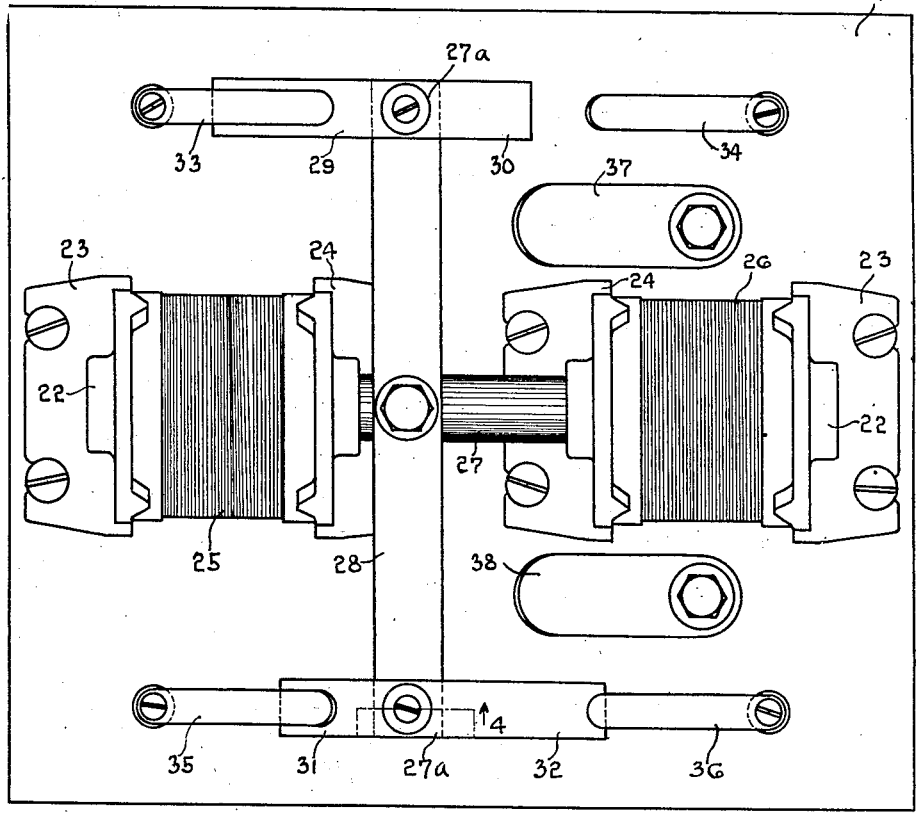
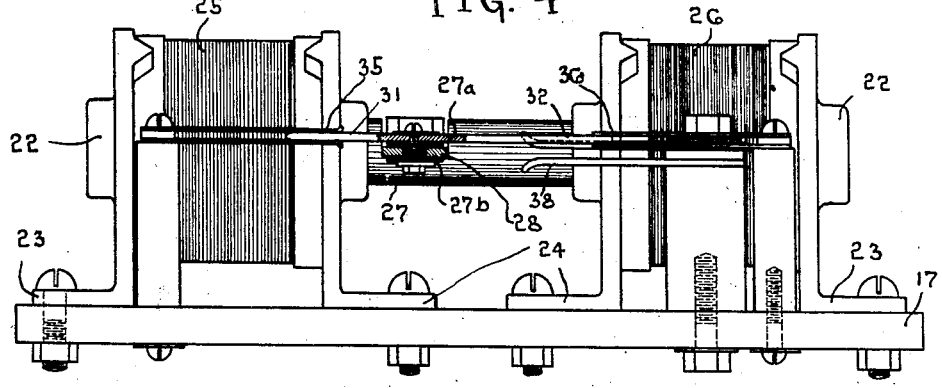

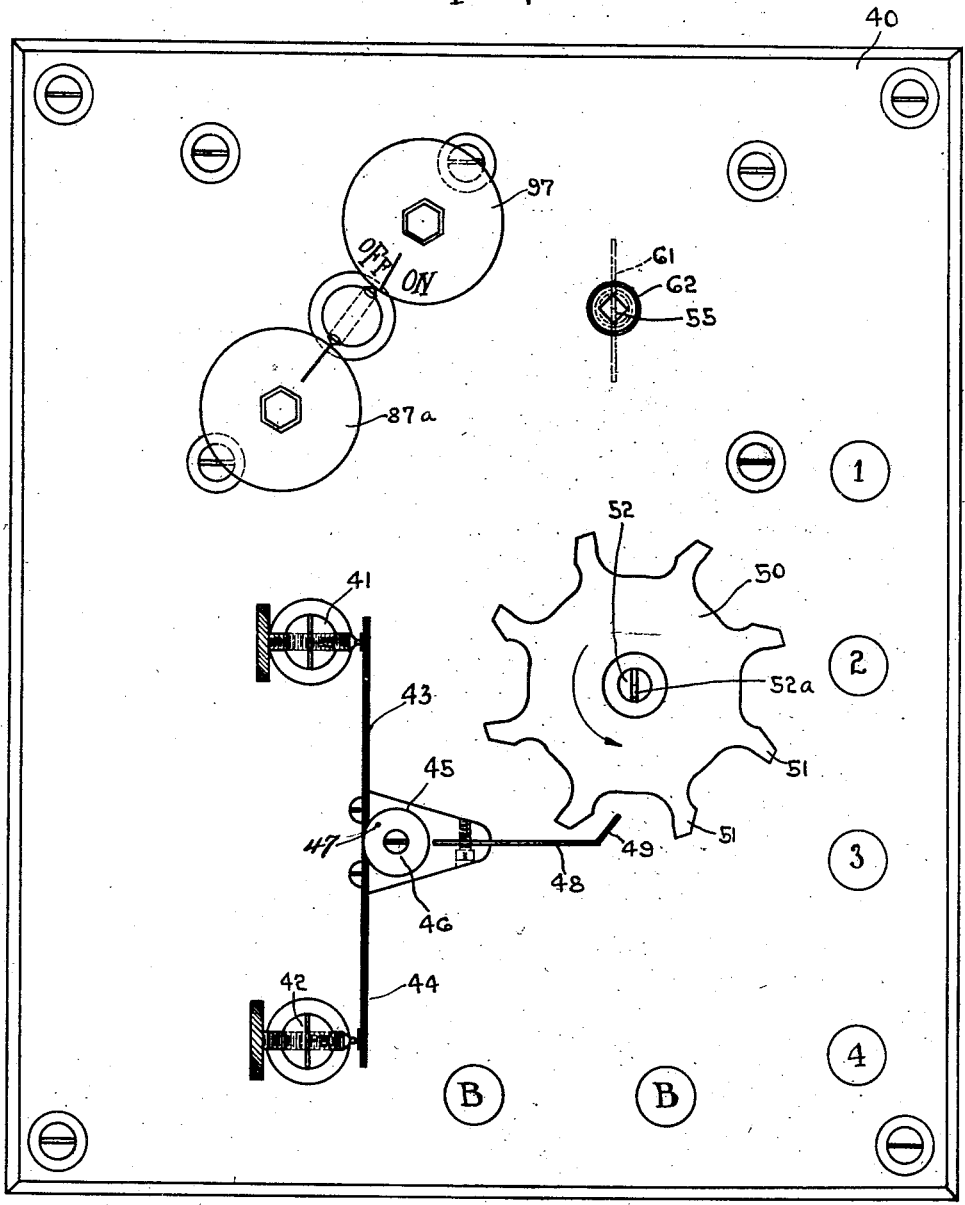

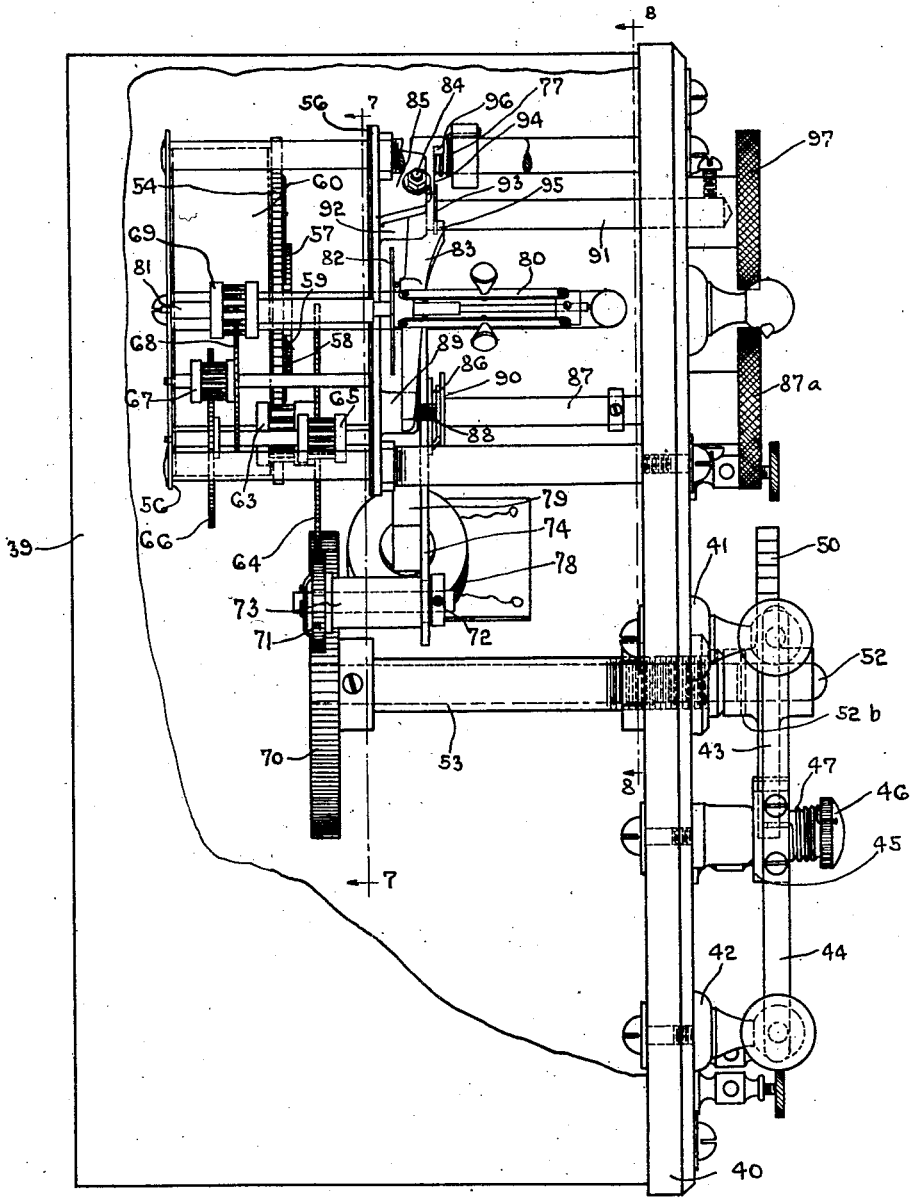

1,272,879.

Patented July 16, 1918.
7 SHEETS—SHEET 6.

Witnesses:

Inventor:
Julius B. Wantz,

Attorneys.

J. B. WANTZ.
ELECTRIC CIRCUIT CONTROLLING MECHANISM.
APPLICATION FILED JUNE 4, 1914.

1,272,879.

Patented July 16, 1918.
7 SHEETS—SHEET 7.

Witnesses:

Inventor:
Julius B. Wantz,
Attorneys.

UNITED STATES PATENT OFFICE.

JULIUS B. WANTZ, OF CHICAGO, ILLINOIS, ASSIGNOR, BY MESNE ASSIGNMENTS, TO VICTOR ELECTRIC CORPORATION, OF CHICAGO, ILLINOIS, A CORPORATION OF NEW YORK.

ELECTRIC-CIRCUIT-CONTROLLING MECHANISM.

1,272,879.  Specification of Letters Patent.  Patented July 16, 1918.

Application filed June 4, 1914. Serial No. 842,948.

*To all whom it may concern:*

Be it known that I, JULIUS B. WANTZ, a citizen of the United States, residing at Chicago, in the county of Cook and State of Illinois, have invented a new and useful Improvement in Electric-Circuit-Controlling Mechanism, of which the following is a specification.

My invention relates to mechanism for controlling the opening and closing of electric circuits in general, but more particularly to controlling the circuit which supplies current to an X-ray tube for use in connection with which I have particularly devised my improved mechanism.

In the use of X-ray tubes for examining patients or making X-ray negatives, a high potential current is used which, if permitted to uninterruptedly pass through the tube for the length of time often required to make an examination or an X-ray negative, will affect the proper action of the tube; and oftentimes so impair it as to render it unfit for immediate or future use.

Furthermore in the making of X-ray negatives of patients it is desirable, especially in the making of negatives of moving organs of a patient and particularly in the making of stereoscopic negatives, that a succession of exposures be taken of the organ, some times at quick and some times at predetermined intervals of time, with each exposure of the same length.

My objects are to provide improved means for controlling, in general, the opening and closing of an electric circuit, particularly without objectionable arcing; to provide in connection with circuits of X-ray apparatus means whereby the tube may be caused to be energized for any desired predetermined length of time uninterruptedly or interruptedly with a time interval, or intervals, of any desired predetermined length, and which, preferably, will operate automatically to accomplish the above-described operation; and other objects as will be apparent from the following description.

Referring to the accompanying drawings—

Figure 7:
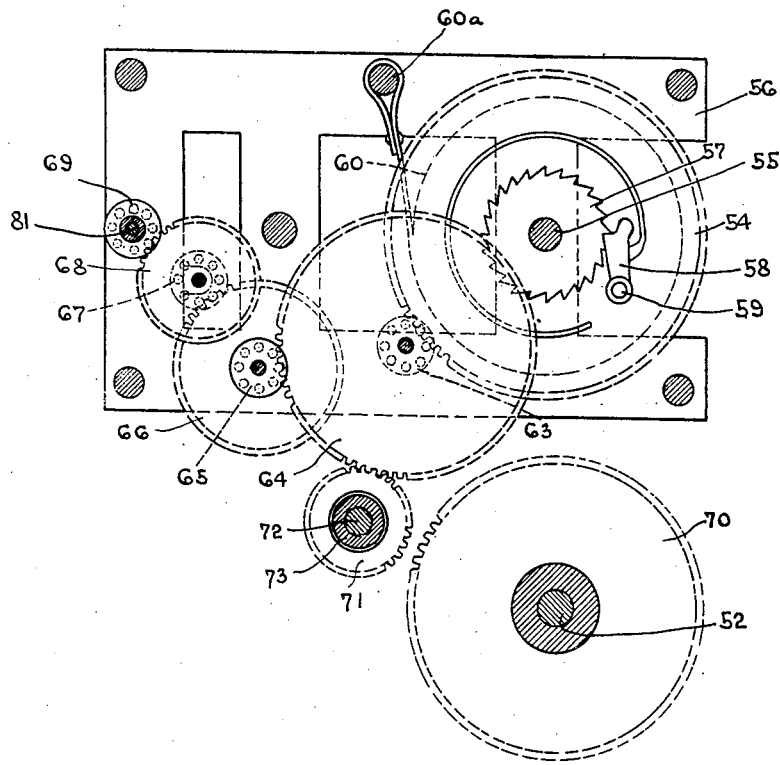
Figure 8:
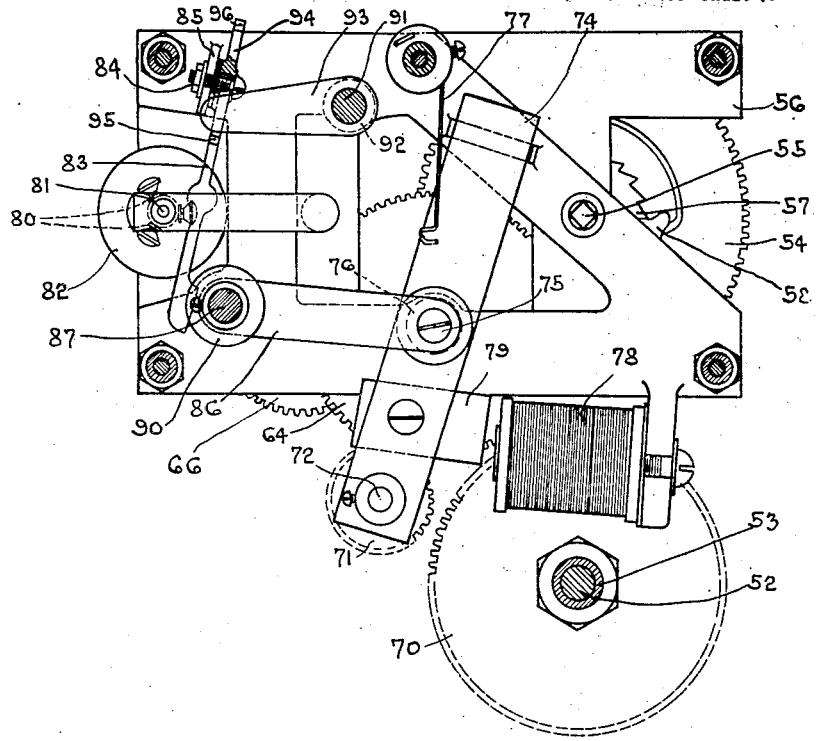
Figure 9:
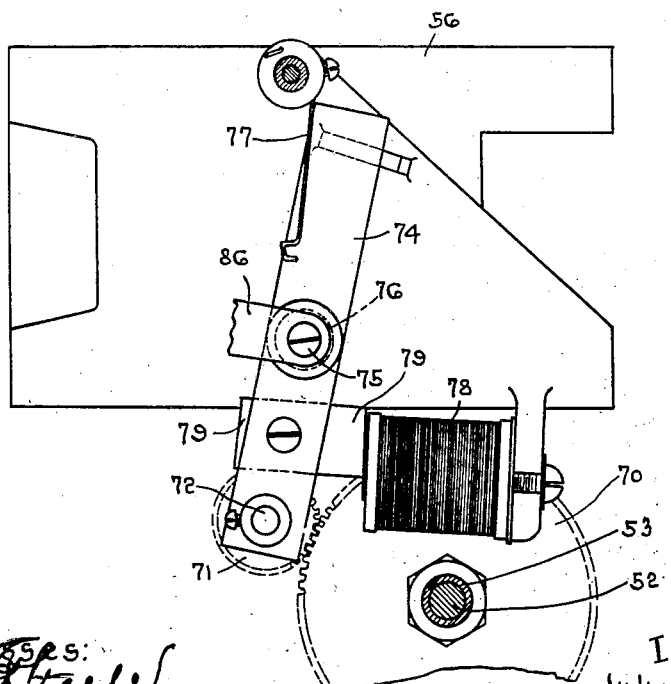

Figure 1 is a diagrammatic view of my improved mechanism as adapted for the opening and closing of a main line circuit of a high potential transformer in X-ray apparatus, the opening and closing of which alternately makes and breaks the circuit through the X-ray tube. Fig. 2 is a view in vertical elevation of a solenoid-operated switch controlling the opening and closing of the main line, the front side of the housing containing the operative parts being broken away and one of the solenoid coils being shown in section, this view showing the parts of the switch in the position they assume when moved to a position for closing the main line. Fig. 3 is a similar view of certain of the parts shown in Fig. 2, the mechanism being shown in the position it assumes when operated to break the main line. Fig. 4 is a bottom plan view of the structure shown in Fig. 3, a portion thereof being shown in section taken at the line 4 on Fig. 3. Fig. 5 is a face view of mechanism for controlling the energization of the solenoid coils of the switch mechanism shown in Figs. 2, 3 and 4, the mechanism being shown in normal position. Fig. 6 is a view in side elevation of the structure shown in Fig. 5, viewed from the left-hand side of this figure, with a portion of the casing broken away to disclose interior details. Fig. 7 is a section taken at the line 7 on Fig. 6 and viewed in the direction of the arrow. Fig. 8 is a section taken at the line 8 on Fig. 6 and viewed in the direction of the arrow, the mechanism being shown in inoperative position; and Fig. 9, a view similar to Fig. 8, with certain of the parts omitted, showing the parts illustrated, during a portion of the operation of the mechanism, namely, while the driving mechanism is operating to control the circuit for actuating the solenoid-operated switch of Figs. 2, 3, and 4.

In the accompanying drawings I have shown my improved mechanism as adapted for controlling the current from a high-potential transformer to an X-ray tube, this current, in accordance with systems heretofore in common use being wholly manually controlled and failing to fulfil the conditions above pointed out as being desirable.

High potential transformers and X-ray tubes and the electrical connections therebetween and with the main line, are of such common knowledge that illustration of the same is unnecessary, it being sufficient to state that, referring to Fig. 1, the main line wires in which the transformer is interposed are represented at 14 and 15 and my improved means are shown as controlling the making and breaking of this circuit, the closing of which causes an electrical current to traverse the X-ray tube (not shown) of the apparatus and the breaking of which breaks the circuit in which the tube is interposed.

The making and breaking of the circuit through the main line (wires 14 and 15) is controlled by a switch illustrated in Figs. 2, 3 and 4, the preferred construction of which is as follows: The housing for the operating parts of the switch, which preferably are immersed in a bath of oil, is represented at 16, said parts being supported on a vertically-disposed plate 17 suspended in the housing by spring-arms 18, secured at their upper ends to the top 19 of the housing, as by bolts 20, and engaging at openings 21 in their lower ends, bosses 22 provided on clips 23 secured to the plate 17, whereby the plate 17 and the parts carried thereby may yield laterally against the tension of the arms 18, for cushioning the blows of the solenoid-plunger hereinafter described, in its reciprocating movements. Confined between the clips 23 and companion clips 24, are two alining solenoid-coils 25 and 26 in which a solenoid-core, or plunger, 27 operates, the core 27 being adapted to be shifted to the right and left alternately by the alternate energization of the coils 25 and 26. The core 27 carries rigid therewith a cross-arm 28 equipped at its opposite ends with contact-blades 27ª insulated therefrom by washers 27ᵇ, each of said blades extending at, preferably, right angles to the arm 28 and beyond the latter at both sides, to afford contacts 29, 30, 31 and 32, the contacts 30 and 31 being shorter than the contacts 29 and 32.

Secured to the plate 17 to coöperate with the contacts 29, 30, 31 and 32, respectively, are contacts 33, 34, 35 and 36, these contacts being arranged to extend in line with the contacts on the cross-arm 28 and each preferably formed of upper and lower spring members so shaped as represented in Fig. 4, as to cause the desired electric contact to be made therewith by the coöperating solenoid-actuated contacts described, when the latter are projected between these spring-members in the reciprocations of the core 27. The contacts 29 and 32 and the contacts 33 and 36 are so arranged that the coöperating shiftable contacts 29 and 32 will not disengage therefrom, respectively when the core 27 is shifted in either direction, but the contacts 30 and 31 and 34 and 35 are so arranged that when the core 27 is moved to the right to the position shown in Fig. 2 by energizing the coil 26, the contact 30 will engage the contact 34, but the contact 31 will disengage the contact 35; and when the core is shifted to the left in Fig. 2 to the position shown in Fig. 3 by energizing the coil 25, the last-referred to contacts will engage and the contacts 30 and 34 will separate, for a purpose hereinafter explained. The cross-arm 28 which is of metal coöperates with contacts 37 and 38 connected with the main-line wires 14 and 15, respectively, and each is formed of two spring members, as explained of the contacts 33 to 36, inclusive, these parts being so arranged that when the core 27 is in the position represented in Fig. 2, the cross-arm 28 will engage the contacts 37 and 38 to close the main-line circuit, but when the core is shifted to the left in this figure to the position shown in Fig. 3, it will disengage therefrom to break the main-line circuit.

In accordance with the preferred illustrated embodiment of my invention, the alternate energization of the coils 25 and 26 for shifting the core 27 to make and break the main-line circuit may be effected automatically, or by hand, as desired, a description of the automatically operating mechanism for this purpose being as follows:

A housing 39 is provided on its cover-section 40 with contacts 41 and 42 arranged in circuit with the contacts of the solenoid-operated switch and with other parts, as hereinafter described. Coöperating with the contacts 41 and 42 are contact-fingers 43 and 44, shown as secured to an oscillating head 45, pivoted, as indicated at 46, to the cover 40. The parts just described are so arranged that when one of the fingers 43 or 44 is in contact with its coöperating stationary contact, the other contact finger will be out of contact with its coöperating stationary contact, a coiled spring 47, surrounding the pivot 46 and engaging said head, serving to normally hold the contact-finger 43 in engagement with the contact 41. The head 45 is equipped with a spring-arm 48, having its outer end upwardly deflected as indicated at 49, this deflected end of the arm 48 extending into the path of movement of mechanism hereinafter described for operating the head 45 for actuating the contact-fingers 43 and 44. The finger 48 is actuated for the purpose stated by means of teeth 51 provided on the periphery of a metal disk 50, this disk being carried on the outer end of a main shaft 52 journaled in the cover 40 and in a bearing 53. The shaft 52 is operated, for the purpose of rotating the disk 50, through the medium of spring-actuated gear mechanism, the gear mechanism comprising a gear 54 journaled on a shaft 55 journaled in the frame 56, a ratchet-wheel 57 fixed on the shaft 55 adapted to engage with a pawl 58 pivoted on the gear 54, as indicated at 59, a spring 60 secured at one end to the shaft 55 and at its other end connected with the frame 56 as represented at 60ª, the shaft 55 being adapted to be rotated for winding up the spring by means of a key 61 insertible through an opening 62 in the plate 40, the mechanism just described being that usually employed in clock-movements. The gear 54 is connected with a train of gears formed of the intermeshing gears 63 to 69, inclusive, carried by shafts journaled in the frame-work 56. The main shaft 52 carries a gear 70 fixed thereon and adapted to be driven by the gear mechanism described through the medium of a gear 71 fixed on a shaft 72, journaled on a sleeve 73 carried by a bar 74, pivoted at 75 between its ends on a boss 76 secured to the frame 56. The gear 71 which is always in mesh with the gear 64, is therefore adapted to be moved into and out of mesh with the gear 70 for intermittently driving the shaft 52. The gear 71 is normally held out of mesh with the gear 70 by means of a spring 77 engaging an edge of the plate 74, as represented in Fig. 8, and is moved into mesh with the gear 70 by energizing an electro-magnet 78 which acts on an armature 79 secured to the bar 74, thus swinging the gear 71 to the position illustrated in Fig. 9, the electrical connections of the coil 78 being hereinafter described.

In the gear mechanism illustrated, means for controlling the speed at which it is operated are provided, these governing means being similar to those generally employed in clock-movements used as motors and comprising a centrifugal governor 80 mounted on the shaft 81, which carries the pinion 69, the friction-plate of this governor being represented at 82 and adapted to coöperate with a finger 83, pivoted as indicated at 84 on a lug 85 on the frame 56. A spring-plate 86 rigid with the boss 76 extends adjacent to one end of the finger 83 beyond the governor 80 and is adapted to limit the swinging movement of the finger 83 and thus determine the speed at which the shaft 81 rotates, the plate 86 being adapted to be adjusted back and forth relative to the finger 83 for varying the speed at which the shaft 81 rotates by means of a screw-shaft 87, journaled at one end in the cover 40 beyond which it is provided with a head 87ᵃ for operating it, and threaded at its inner end at 88 in a boss 89 on the frame 56, the shaft 87 being provided with a disk 90 bearing against the plate 86. Upon turning the shaft 87, the plate 86 is adjusted toward or away from the finger 83, depending upon the direction in which the shaft 87 is rotated, for adjusting the plate 86 relative to the finger 83 for the purpose stated.

The starting and stopping of the gear mechanism is controlled by a shaft 91, journaled in the cover 40 and in a boss 92 on the frame 56, this shaft being provided with a laterally-extending spring-finger 93, bearing against a surface 94 on the finger 83 between stops 95 and 96 on the latter, the surface 94 extending across the pivot 84; whereby the finger 83 may be rocked in either direction on the pivot 84, depending upon the direction in which the shaft 91, which carries a finger-wheel 97, is operated. Thus, when the finger 93 is in the position shown in Fig. 6, it will hold the finger 83 in the position illustrated in Fig. 6, in which the disk 82 is held against rotation by frictional contact with the finger 83 and consequently the gear mechanism is at rest. When, however, the finger 93 is moved from the position illustrated in Fig. 6 to a position on the opposite side of the pivot 84, it will free the disk-engaging arm of this finger and permit the gear mechanism to operate, it being understood, however, from the foregoing that as this end of the finger 83 coöperates with the plate 86, as hereinbefore stated, the speed at which the gear mechanism operates is controlled by the position of the plate 86.

Referring to the diagram shown in Fig. 1, the circuit connections of the apparatus are as follows, the arrangement therein shown adapting the solenoid-operated switch to be operated either wholly by manual means or automatically, as desired. 98 and 99 represent wires leading from any suitable source of electrical energy, as for example, the generator represented at X, but which may, if desired, be any other suitable source of electrical energy, the wire 99 being connected with one of the terminals of each solenoid coil 25 and 26, and the wire 98 electrically connected with a switch-arm 100 adapted to be moved into engagement with either of the contacts 101 and 102. One of the terminals of the coil 78 connects with a wire 103 extending from a switch 104, the other contact of this switch being connected with a wire 105 connected with the wire 98, the other terminal of the coil 78 being connected with the wire 99 by a wire 106. A wire 107 connects with the wire 103 and is electrically connected with the disk 50, a wire 108 being connected at one end with the contact 102 and at its opposite end with the oscillating head 45. The contact 41 is connected with the contact 34 by means of a wire 109, and the contact 42 is connected with the contact 35 by means of a wire 110. The ends of the windings of the coils 25 and 26 opposite to those connected with the wire 99 are connected, respectively, with the contacts 33 and 36 by wires 111 and 111ᵃ, respectively. The contact 101 is connected by a wire 114 with the contact 112 of a three-point switch diagrammatically illustrated at 113, the other contacts 115 and 116 of the switch 113 being connected with the wires 109 and 110, respectively, the switch diagrammatically illustrated at 113 being of a common type which operates, when actuated, to electrically connect its contact 112 with the contacts 115 and 116 alternately, and preferably remain in engagement with the contact into engagement with which it is moved until again operated to engage the other contact. The apparatus is shown in all of the figures, excepting in Figs. 2 and 9, in normal inoperative position, namely, with the main circuit represented by the wires 14 and 15 open.

To operate the solenoid-actuated switch by the automatic controlling mechanism, the operator first swings the switch lever 100 into engagement with the contact 102. Thereupon he closes the switch 104, which is preferably a hand-operated push-button switch. Thus closing the switch 104 establishes the following circuit: the wire 99 through wire 106, coil 78, wire 103, switch 104 and wire 105 to wire 98, which causes the coil 78 to be energized. The operator before closing the switch 104 having turned the shaft 91 to swing the finger 93 to a position in which the finger 83 is moved away from the disk 82, the gear mechanism starts to rotate under the action of the spring 60, driving the gear 71, which, as hereinbefore stated, is out of mesh with the gear 70 in the normal position of the mechanism. The energizing of the coil 78 by closing the switch 104, as above stated, swings the bar 74 toward the coil and causes the gear 71 to mesh with the gear 70, thus causing the disk 50 to rotate. As the disk 50 rotates, in the direction of the arrow in Fig. 1, the teeth 51 are successively carried into engagement with the deflected end 49 of the arm 48, with the result of rocking the head 45 on the pivot 46 to break the circuit between the contact 41 and finger 43 and close the circuit between the contact 42 and the finger 44, each time a tooth engages the finger 48, it being understood that the finger 44 will remain in engagement with the contact 42 as long as the tooth 51 remains in engagement with the deflected end of the finger 48 and that as soon as the tooth has disengaged from this finger, the spring 47 will immediately return the head 45 to normal position to break the circuit between the contact 42 and finger 44 and close the circuit between the contact 41 and finger 43, as shown in Fig. 5. As soon as one of the teeth 51 engages the finger 48, as stated, and moves the finger 44 into engagement with the contact 42, the following circuit is established: from the wire 98 through switch-arm 100, contact 102, wire 108, head 45, finger 44, contact 42, wire 110, contacts 35, 31, 32 and 36, wire 111ª, solenoid-coil 26, and thence to wire 99, thus energizing the coil 26 which shifts the core 27 to the right in Figs. 1 and 3, carrying the cross-bar 28 into engagement with the contacts 37 and 38 and thereby closing the main circuit, of which the wires 14 and 15 are a part, which energizes the X-ray tube (not shown). The shifting of the cross-bar 28 to the right in Fig. 3 as stated, moves the contact-finger 30 into engagement with the contact 34 and withdraws the contact-finger 31 from engagement with the contact 35, as shown in Fig. 2, thus breaking the circuit through the coil 26. As soon as the tooth 51 disengages the deflected end of the finger 48, the contact fingers 43 and 44 are automatically returned to normal position (Fig. 1) as hereinbefore described, thus breaking the circuit at the contact 42 and closing the circuit at the contact 41, the circuit thus established being as follows: from the wire 98 through switch-arm 100, contact 102, wire 108, head 45, contact-finger 43, contact 41, wire 109, contacts 34, 30, 29 and 33, wire 111, solenoid-coil 25, to wire 99, thus energizing the coil 25, which operates to return the core 27 and the parts carried thereby to normal position (Fig. 3), which causes the cross-arm 28 to disengage from the contacts 37 and 38, breaking the circuit of which the wires 14 and 15 are a part, which breaks the circuit through the X-ray tube (not shown). Shifting the core 27, as stated, to the position shown in Fig. 3, causes the finger 31 to be moved into engagement with the contact 35 and disengages the finger 30 from the contact 34, in which position the apparatus is adapted to be again operated to close the circuit at the contacts 37 and 38 when another of the teeth 51 engages the finger 48, as hereinbefore described.

It will be understood from the foregoing that each time a tooth 51 engages the finger 48, the circuit in which the X-ray tube is interposed will be closed, remaining closed until the tooth disengages the finger 48, and being automatically broken upon disengagement of the tooth with the finger 48; and that the disk 50 will continue to rotate to move its teeth 51 successively into and out of engagement with the finger 48 as long as the switch 104 remains closed and the coil 78 energized, deënergizing the coil 78 permitting the spring 77 to return the bar 74 to a position in which the gear 71 is out of mesh with the gear 70.

It is desirable that provision be made against the disk 50 stopping in a position wherein one of its teeth 51 engages the finger 48, should the operator open the switch 104 while the tooth is in engagement with this arm, and in the arrangement illustrated, this is accomplished in the following manner: As soon as a tooth 51 engages the finger 48, the following circuit is established: from the wire 98, switch-arm 100, contact 102, wire 108, head 45, finger 48, disk 50, wire 107, coil 78 wire 106 to wire 99, which thus causes the coil 78 to remain energized, after the switch 104 is opened, as long as a tooth 51 is in engagement with the finger 48, and therefore the disk cannot stop its rotation while in engagement with the finger 48.

It will be readily understood from the foregoing that by adjusting the speed-controlling mechanism described for the spring motor, the length of time that the teeth are in contact with the finger 48 may be varied to hold the main line closed for a greater or less length of time, as desired, the teeth 51 on the disk 50 being preferably of exactly the same form and equidistantly spaced apart to cause the main-line circuit to remain closed upon the engagement of each tooth with the finger 48, for the same length of time and the main-line circuit to remain broken during the intervals of the disengagement of the teeth 51 from the finger 48, for the same length of time, in order that the flashes produced by the energizing of the X-ray tube shall be of uniform duration with uniform time intervals therebetween. It is desirable, however, instead of providing one disk 50 and producing variations in the timing of the operation of the solenoid-operated switch by varying the speed of the spring-motor; to provide for the variation primarily by the use of disks like the disk 50, excepting that the bearing surfaces on the teeth for engagement with the finger 48 are of different lengths, and the teeth are spaced apart a greater or less distance. In practice it is desirable that a variety of the disks 50 be provided with the bearing surfaces of the teeth and their spacing apart such that the proper timing of the solenoid-actuated switch to time the successive energizings of the X-ray tube may be effected; though if desired, the timing of the opening and closing of the main-line circuit may be varied by adjusting the speed of the spring motor by using one disk 50 only where it is desired that the time intervals during which the main-line circuit is open shall bear the same relation to the periods during which the main-line circuit is closed; and it will be readily understood that the feature of providing a plurality of disks 50 with different arrangement of teeth 51 thereon may, if desired, be utilized in connection with the feature of adjusting the speed at which the spring motor is driven to produce different combinations of time durations.

Where different disks 50 are used, the disks are adapted to be applied to and removed from the main shaft 52, and releasably held thereon as by slitting the outer end of the shaft 52 as indicated at 52$^a$ providing a slot wherein the key 52$^b$, rigidly fastened to disk 50, slips.

It will also be understood from the foregoing that in the operation of the apparatus the respective circuits in which the contacts 41 and 42 are interposed are broken by the movement of the solenoid 27 before a break occurs at the said contacts, and thus arcing of the current at the contacts 41 and 42 is avoided.

When it is desired that the solenoid-actuated switch be operated from the hand-operated switch 113, the operator will first swing the switch lever 100 into engagement with the contact 101, and assuming the solenoid-actuated switch to be in the position illustrated in Figs. 1 and 3, the actuation of the switch 113 will make contact with the contact 116 and thereby establish the following circuit: through wire 98, switch-arm 100, contact 101, wire 114, switch 113, wire 118, wire 110, contacts 35, 31, 32, 36, wire 111$^a$, coil 26 to wire 99, which energizes the coil 26, closing the main-line circuit at the contacts 37 and 38, disengaging the contact 31 from the contact 35, and moving the contact 30 into engagement with the contact 34. Upon the next actuation of the switch 113, the contacts 112 and 115 thereof engage and establish the following circuit: through wire 98, switch 100, contact 101, wire 114, switch 113, wire 117, wire 109, contacts 34, 30, 29 and 33, wire 111, coil 25 to wire 99, which thus energizes the coil 25 and returns the core 27 to normal position (Fig. 1) for breaking the circuit at the contacts 37 and 38, disengaging the contact 30 from the contact 34, and moving the contact 31 into engagement with the contact 35, each time the switch 113 is twice operated the core 27 making a complete reciprocation for opening and closing the main-line circuit. As in the case of the automatic mechanism hereinbefore described, the circuits in which the contacts 115 and 116 are interposed are first broken at the contacts operated by the solenoid coils 25 and 26 in order to avoid arcing at the switch 113.

In addition to the desirable feature of preventing arcing at the switches controlling the actuation of the solenoid-operated switch, the latter presents the advantage of dispensing with the use of springs for actuating the core in one direction, and by reason of the manner of supporting the plate 17, the blow of the core 27 when operating in either direction is cushioned.

It is desirable in making fluoroscopic examinations or X-ray negatives that during the time the X-ray tube is not energized the room be sufficiently lighted to permit the operator and patient to have sufficient vision to enable them to move about the room and to make such adjustments of the apparatus used as are desirable, this light however should not be of such character as to cause the pupils of the eyes to return to normal undilated condition, as this would temporarily impair the vision of the operator for making examinations and require that he suspend the examination until his eyes again assumed dilated condition. To furnish sufficient light for the above purpose which will not contract the pupil, I provide a blue-glass incandescent lamp represented at 119 and which would be located in the room with the X-ray apparatus and interpose it between the contact 34 and the wire 99 by means of wires 120 and 121, whereby the lamp 119 is automatically energized when the main line circuit of which the wires 14 and 15 are a part, is open and automatically deënergized when this circuit is closed.

While I have described my improved circuit-controlling means as used in connection with X-ray apparatus, it will be readily understood that it may be used in any other situation wherein the control of an electrical circuit in the manner above described, is desired. Furthermore, various changes and alterations may be made in the apparatus illustrated without departing from the spirit of my invention, it being my intention to claim my invention as broadly and fully as the state of the art will permit.

What I regard as new and desire to secure by Letters Patent is—

1. In circuit-controlling mechanism, the combination of a pair of contacts, a shiftable contact member movable to alternately engage said contacts, a movable member provided with projections adapted to be moved successively into engagement with said contact member for actuating the latter out of engagement with one of said contacts and into engagement with the other of said contacts, said projections being relatively abrupt and said contact member operating to return to normal position in which it engages the other of said contacts, after disengaging from a projection and opposing the surface of said movable member at the base of the projection, a constantly operating power device and means for alternately connecting and disconnecting said member from said power device for controlling the actuation of said member from said device while the latter is operating.

2. In circuit-controlling mechanism, the combination of a pair of contacts, a shiftable contact member movable to alternately engage said contacts, a rotatable member provided with projections adapted to be moved successively into engagement with said contact member for actuating the latter out of engagement with one of said contacts and into engagement with the other of said contacts, said projections being relatively abrupt and said contact member operating to return to normal position in which it engages the other of said contacts, after disengaging from a projection and opposing the surface of said rotatable member at the base of the projection, a constantly operating power device and means for alternately connecting and disconnecting said member from said power device for controlling the actuation of said member from said device while the latter is operating.

3. In circuit-controlling mechanism, the combination of a pair of contacts, a shiftable contact member movable to alternately engage said contacts, and provided with an arm, a movable member provided with projections adapted to be moved successively into engagement with said arm for actuating said contact member out of engagement with one of said contacts and into engagement with the other of said contacts, said projections being relatively abrupt with the surface of said movable member at the base of the projections so disposed that when said arm opposes said surface said contact member will be in engagement with the other of said contacts, and means operating upon the disengagement of said arm with said projections to shift said contact member into said last-referred-to position, a constantly operating power device and means for alternately connecting and disconnecting said member from said power device for controlling the actuation of said member from said device while the latter is operating.

4. In circuit-controlling mechanism, the combination of a pair of stationary contacts, a movable contact member coöperating with said contacts, a shiftable device for operating said movable contact member, means for shifting said device comprising a gear connected with said member, gear-mechanism, means for operating said gear-mechanism, a gear constantly in mesh with said gear-mechanism and shiftable into and mesh with said first-named gear for driving the latter from said gear-mechanism, and means for shifting said last-named gear.

5. In circuit-controlling mechanism, the combination of a pair of stationary contacts, a movable contact member coöperating with said contacts, a shiftable device for operating said movable contact member, means for shifting said device comprising a gear connected with said device, gear-mechanism, means for operating said gear-mechanism, a pivotally-supported arm, a gear journaled on said arm and adapted when the arm is swung to one position, to mesh with said first-named gear and said gear-mechanism, and when swung out of said position to disengage said gear-mechanism from said last-referred-to gear, an electromagnet operating when energized to swing said arm to a position in which the gear carried thereby, meshes with said gear-mechanism and said first-named gear, and means for energizing said magnet.

6. In circuit-controlling mechanism, the combination of a contact-operating rotatable member provided with projections, a movable contact-device adapted to be engaged and actuated by said projections when said member is rotated, and means for rotating said member comprising a power device, an electro-magnet-mechanism controlling said power mechanism, said power device operating upon energizing said magnet to drive said member, means for energizing said magnet, and electrical means for maintaining current through said magnet during the engagement of a projection with said contact-device, for the purpose set forth.

7. In circuit-controlling mechanism, the combination of contacts, a shiftable device adapted to alternately engage said contacts, a rotatable member provided with projections adapted to successively engage said shiftable device for shifting the latter, means for actuating said rotatable member comprising electrically-controlled power mechanism operating when energized to drive said rotatable member, and electrical means for maintaining current through said electrically-controlled mechanism while a projection is in engagement with said contact-device.

8. In circuit-controlling mechanism, the combination of contacts, a shiftable device adapted to alternately engage said contacts, a rotatable member provided with projections adapted to successively engage said shiftable device for shifting the latter, means for actuating said rotatable member comprising electrically-controlled power mechanism operating when energized to drive said rotatable member, and an electrical circuit in which one of said contacts is interposed, for maintaining current through said electrically-controlled power mechanism while a projection is in engagement with said contact-device.

9. In circuit-controlling mechanism, the combination of a contact-operating shiftable member provided with projections, a contact-device adapted to be engaged by said projections when said member is shifted, electrically-controlled means for controlling the actuation of said member, and electrical means for insuring the continuation of the movement of said shiftable member to a position in which said contact-device is out of engagement with any of the projections.

10. In circuit-controlling mechanism, the combination of a shiftable member provided with a plurality of projections, a movable contact device coöperating with said projections and adapted to be engaged and actuated by the latter, and means for shifting said member comprising electrically-controlled power mechanism operating when energized to drive said member, means for supplying current to said power mechanism, controllable to vary the extent of movement of said member, and electrical means for maintaining current through said electrically-controlled power mechanism while any of said projections is in engagement with said contact-device.

11. In circuit-controlling mechanism, the combination of a shiftable member provided with a plurality of projections, a contact device coöperating with said projections and in circuit therewith, and means for shifting said member comprising electrically-controlled power mechanism operating when energized to drive said member, means for supplying current to said power mechanism, controllable to vary the extent of movement of said member, and electrical means for maintaining current through said electrically-controlled power mechanism while any of said projections is in engagement with said contact-device.

12. In circuit-controlling mechanism, the combination of a pair of stationary contacts, a contact member pivotally supported between its ends and provided with contacts at its opposite ends adapted to coöperate with said stationary contacts, said contact member being so disposed that it is in engagement with one only of said contacts at a time, an arm extending from said contact member at an angle thereto, a rotatable member provided with projections adapted to be moved successively into engagement with said arm for actuating said contact member relative to said stationary contacts, a constantly operating power device and means for alternately connecting and disconnecting said rotatable member from said power device for controlling the actuation of said member from said device while the latter is operating.

13. In circuit-controlling mechanism, the combination with a main line circuit, of a switch for opening and closing said circuit, a pair of electromagnets, one of said magnets when energized moving said switch to open position and the other magnet when energized moving said switch to closed position, a second switch having two positions, the normal position closing the circuit through the magnet which causes said main line switch to be open, and its second position closing the circuit through the magnet which causes said main line switch to be closed, means adapted to operate said second switch to move it to its said second position, time-operated mechanism to control the movement of said last-mentioned means, and manual means to throw said time-mechanism into and out of operation.

14. In circuit-controlling mechanism, the combination with a main line circuit, of a switch for opening and closing said circuit, a pair of electromagnets, one of said magnets when energized moving said switch to open position and the other magnet when energized moving said switch to closed position, a second switch having two positions, the normal position closing the circuit through the magnet which causes said main line switch to be open, and its second position closing the circuit through the magnet which causes said main line switch to be closed, means adapted to operate said second switch to move it to its said second position, time-operated gearing mechanism to control the movement of said last-mentioned means, and manual means to throw said time-mechanism into and out of operation.

15. In circuit-controlling mechanism, the combination with a main line circuit, of a switch for opening and closing said circuit, a pair of electromagnets, one of said magnets when energized moving said switch to open position and the other magnet when energized moving said switch to closed position, a second switch having two positions, the normal position closing the circuit through the magnet which causes said main line switch to be open, and its second position closing the circuit through the magnet which causes said main line switch to be closed, means adapted to operate said second switch to move it to its said second position, time-operated mechanism to control the movement of said last-mentioned means, solenoid actuated means to throw said time-mechanism into and out of operation, and manual means for controlling the actuation of said solenoid.

16. In circuit-controlling mechanism, the combination with a main line circuit, of a switch for opening and closing said circuit, a pair of electromagnets, one of said magnets when energized moving said switch to open position and the other magnet when energized moving said switch to closed position, a second switch having two positions, the normal position closing the circuit through the magnet which causes said main line switch to be open, and its second position closing the circuit through the magnet which causes said main line switch to be closed, means adapted to operate said second switch to move it to its said second position, gear mechanism, means for continuously rotating said gear mechanism, a gear driven by said gear mechanism and mounted to be moved into and out of operative connection with said last-mentioned means, and manual means controlling the movement of said last mentioned gear into and out of operative relation to said means.

17. In circuit-controlling mechanism, the combination with a main line circuit, of a switch for opening and closing said circuit, a pair of electromagnets, one of said magnets when energized moving said switch to open position and the other magnet when energized moving said switch to closed position, a second switch having two positions, the normal position closing the circuit through the magnet which causes said main line switch to be open, and its second position closing the circuit through the magnet which causes said main line switch to be closed, a rotatable member provided with projections which are engaged by said second switch in the rotation of said member and which operate to move said second switch to its said second position, time-operated mechanism to control the movement of said rotatable member, and manual means to throw said time-mechanism into and out of operation.

18. In circuit-controlling mechanism, the combination with a main line circuit, of switch mechanism for opening and closing said circuit, time-controlled mechanism operating to cause said switch to be intermittently opened and closed, the periods during which the switch is open being of the same length, and manual-controlled means controlling the actuation of said second-named mechanism to cause the switch to be alternately opened and closed for any desired number of periods at the will of the operator.

JULIUS B. WANTZ.

In presence of—
A. C. FISCHER,
F. A. FLORELL.